(12) United States Patent
Lee et al.

(10) Patent No.: US 9,158,150 B2
(45) Date of Patent: Oct. 13, 2015

(54) BACKLIGHT ASSEMBLY AND A DISPLAY APPARATUS HAVING THE SAME

(71) Applicant: SAMSUNG DISPLAY CO., LTD., Yongin, Gyeonggi-Do (KR)

(72) Inventors: Jae-Sang Lee, Asan-si (KR); Kyu-Hun Shim, Seoul (KR); Jae-Suk Yoo, Seoul (KR); Min-Su Jung, Chungju-si (KR)

(73) Assignee: Samsung Display Co., Ltd., Yongin, Gyeonggi-do (KR)

( * ) Notice: Subject to any disclaimer, the term of this patent is extended or adjusted under 35 U.S.C. 154(b) by 49 days.

(21) Appl. No.: 14/094,913

(22) Filed: Dec. 3, 2013

(65) Prior Publication Data
US 2015/0023001 A1 Jan. 22, 2015

(30) Foreign Application Priority Data
Jul. 19, 2013 (KR) .......................... 10-2013-0085379

(51) Int. Cl.
*G02F 1/1335* (2006.01)
(52) U.S. Cl.
CPC ................................ *G02F 1/133602* (2013.01)
(58) Field of Classification Search
CPC ............... G02F 1/133603; G02F 2001/133612
See application file for complete search history.

(56) References Cited

U.S. PATENT DOCUMENTS

| | | | |
|---|---|---|---|
| 2005/0157494 A1* | 7/2005 | Chou et al. | 362/225 |
| 2007/0170858 A1 | 7/2007 | Cho et al. | |
| 2008/0231776 A1* | 9/2008 | Shin et al. | 349/69 |
| 2011/0141158 A1* | 6/2011 | Park et al. | 345/690 |

FOREIGN PATENT DOCUMENTS

| | | |
|---|---|---|
| KR | 20-0440245 | 5/2008 |
| KR | 1020080074452 | 8/2008 |
| KR | 1020090073458 | 7/2009 |
| KR | 1020100086157 | 7/2010 |
| KR | 1020120017858 | 2/2012 |
| KR | 1020120036661 | 4/2012 |
| KR | 1020120066337 | 6/2012 |
| KR | 101190073 | 10/2012 |

* cited by examiner

*Primary Examiner* — Mary Ellen Bowman
(74) *Attorney, Agent, or Firm* — F. Chau & Associates, LLC

(57) ABSTRACT

A backlight assembly includes a first light source part including a plurality of light sources and extending in a first direction, a second light source part including a plurality of light sources, wherein the second light source part is spaced apart from and in parallel with the first light source part, and a driving part disposed between the first light source part and the second light source part. The driving part is connected to the first and second light source parts, and is configured to drive the light sources of the first and second light source parts.

18 Claims, 11 Drawing Sheets

BACKLIGHT ASSEMBLY AND A DISPLAY APPARATUS HAVING THE SAME

CROSS-REFERENCE TO RELATED APPLICATION

This application claims priority under 35 U.S.C. §119 to Korean Patent Application No. 10-2013-0085379, filed on Jul. 19, 2013, the disclosure of which is incorporated by reference herein in its entirety.

TECHNICAL FIELD

The present invention relates to a backlight assembly and a display apparatus including the backlight assembly.

More particularly, the present invention relates to a backlight assembly for a liquid crystal display apparatus and a display apparatus including the backlight assembly.

DISCUSSION OF THE RELATED ART

A liquid crystal display apparatus is used in a wide range of applications due to its small size, light weight and low-power-consumption, for example.

The liquid crystal display apparatus includes two display panels provided with a liquid crystal layer disposed therebetween and applies a voltage to a molecular arrangement of liquid crystal molecules in the liquid crystal layer to change the molecular arrangement. The liquid crystal display apparatus displays an image by using changes of an optical property (for example, birefringence, rotary polarization, dichroism and light scattering) of a liquid crystal cell according to the changes of the molecular arrangement.

The liquid crystal display apparatus includes a backlight assembly for providing light to a display panel for displaying an image. The backlight assembly includes a plurality of components, which contribute to the thickness of the liquid crystal display apparatus.

SUMMARY

An exemplary embodiment of the present invention provides a backlight assembly capable of improving assembly efficiency and decreasing whole thickness of a display apparatus.

An exemplary embodiment of the present invention provides a display apparatus including the backlight assembly.

According to an exemplary embodiment of the present invention, a backlight assembly includes a first light source part comprising a plurality of light sources and extending in a first direction, a second light source part comprising a plurality of light sources, wherein the second light source part is spaced apart from and in parallel with the first light source part, and a driving part disposed between the first light source part and the second light source part. The driving part is connected to the first and second light source parts, and is configured to drive the light sources of the first and second light source parts.

In an exemplary embodiment of the present invention, the driving part may include a driving part substrate, a transformer configured to boost an input voltage to a driving voltage for the light sources of the first and second light source parts, and a driving chip configured to process a driving signal for the light sources of the first and second light source parts.

In an exemplary embodiment of the present invention, an opening may be formed through the driving part substrate. The transformer may be disposed in the opening.

In an exemplary embodiment of the present invention, the driving chip of the driving part may be disposed on a surface of the driving part substrate. The transformer may be protruded from the surface of the driving part substrate by substantially the same height as the driving chip.

In an exemplary embodiment of the present invention, the transformer may be disposed at a center of the driving part substrate.

In an exemplary embodiment of the present invention, a reflecting layer may be formed on the transformer.

In an exemplary embodiment of the present invention, a center of the first light source part may be connected to a first side of the driving part. A center of the second light source part may be connected to a second side of the driving part which is opposite to the first side.

In an exemplary embodiment of the present invention, first and second connectors may be protruded from the center of the first light source part and the center of the second light source part, respectively. Third and fourth connectors may be protruded from the first side and the second side of the driving part, respectively. The first light source part and the second light source part may be connected to the driving part by first and second connecting parts, respectively. The first connecting part may include a first socket in which the first connecter of the first light source part is inserted, and a second socket in which the third connecter of the driving part is inserted.

According to an exemplary embodiment of the present invention, a display apparatus includes a backlight assembly, a reflecting element disposed on the backlight assembly, a display panel disposed on the reflecting element, and a receiving container configured to receive the backlight assembly, the reflecting element and the display panel. The backlight assembly includes a first light source part comprising a plurality of light sources and extending in a first direction, a second light source part comprising a plurality of light sources, wherein the second light source part is spaced apart from and in parallel with the first light source part, and a driving part disposed between the first light source part and the second light source part. The driving part is connected to the first and second light source parts, and is configured to drive the light sources of the first and second light source parts.

In an exemplary embodiment of the present invention, the reflecting element may include a bottom portion and an inclined portion formed at boundaries of the bottom portion. The inclined portion may be slanted with respect to the bottom portion. A plurality of light holes which corresponds to each of the light sources of the first and second light source parts may be formed through the bottom portion.

In an exemplary embodiment of the present invention, the driving part of the backlight assembly may include a driving part substrate, a transformer configured to boost an input voltage to a driving voltage for the light sources of the first and second light source parts, and a driving chip configured to process a driving signal for the light sources of the first and second light source parts.

In an exemplary embodiment of the present invention, a first opening may be formed through the driving part substrate. The transformer may be disposed in the first opening.

In an exemplary embodiment of the present invention, a second opening which exposes the transformer may be formed through the bottom portion of the reflecting element.

In an exemplary embodiment of the present invention, the driving chip of the driving part may be disposed on a surface of the driving part substrate. The receiving container may include a bottom chassis and a top chassis combined with the bottom chassis. The bottom chassis may include a bottom plate in parallel with the display panel and a side wall extending from a boundary of the bottom plate and forming a receiving space. A first recess configured to receive the driving chip may be formed on the bottom plate.

In an exemplary embodiment of the present invention, the display apparatus may further include a connecting part configured to connect the first or second light source part to the driving part. A second recess configured to partially receive the connecting part may be formed on the bottom plate of the bottom chassis.

In an exemplary embodiment of the present invention, the driving part of the backlight assembly may be disposed between the bottom portion of the reflecting element and the bottom plate of the bottom chassis.

In an exemplary embodiment of the present invention, the side wall of the bottom chassis may extend from the bottom plate. The side wall may include an inclined surface inclined with respect to the bottom plate and an outer wall extending from the inclined surface perpendicular to the bottom plate.

In an exemplary embodiment of the present invention, the inclined portion of the reflecting element may make an angle about 20 degrees to about 30 degrees with respect to bottom portion.

According to an exemplary embodiment of the present invention, a display apparatus includes a backlight assembly, a reflecting element disposed on the backlight assembly, a display panel disposed on the reflecting element, and a receiving container configured to receive the backlight assembly, the reflecting element and the display panel. The backlight assembly includes a driving part disposed at a center of the display panel, a first light source part, a second light source part, a third light source part, a fourth light source part, a fifth light source part and a sixth light source part. The first light source part includes a plurality of light sources, extends in a first direction, and is connected to the driving part. The second light source part includes a plurality of light sources, extends in the first direction, is connected to the driving part, and disposed in a symmetrical relationship with the first light source part with respect to the driving part. The third light source part includes a plurality of light sources, extends in the first direction, is connected to the driving part, and is spaced apart from and disposed in parallel with the first light source part. The fourth light source part includes a plurality of light sources, extends in the first direction, is connected to the driving part, and is disposed in a symmetrical relationship with the third light source part with respect to the driving part. The fifth light source part includes a plurality of light sources, extends in the first direction, is connected to the driving part, and is spaced apart from and disposed in parallel with the third light source part. The sixth light source part includes a plurality of light sources, extends in the first direction, is connected to the driving part, and is disposed in a symmetrical relationship with the fifth light source part with respect to the driving part.

In an exemplary embodiment of the present invention, one of the light sources of the first light source part and one of the light sources of the fifth light source part may be arranged in a first column. Another one of the light sources of the first light source part and another one of the light sources of the fifth light source part may be arranged in a second column. One of the light sources of the third light source part may be disposed between the first and second columns.

According to an exemplary embodiment of the present invention, a backlight assembly, includes: a first light source part including a plurality of light sources arranged in a first direction; a second light source part including a plurality of light sources arranged in the first direction; and a driving part disposed between a central portion of the first and second light source parts, wherein the driving part includes an opening in which a transformer is disposed.

BRIEF DESCRIPTION OF THE DRAWINGS

The above and other features of the present invention will become more apparent by describing in detail exemplary embodiments thereof with reference to the accompanying drawings, in which.

DETAILED DESCRIPTION OF THE EMBODIMENTS

Hereinafter, exemplary embodiments of the present invention will be explained in detail with reference to the accompanying drawings.

Figure 1:
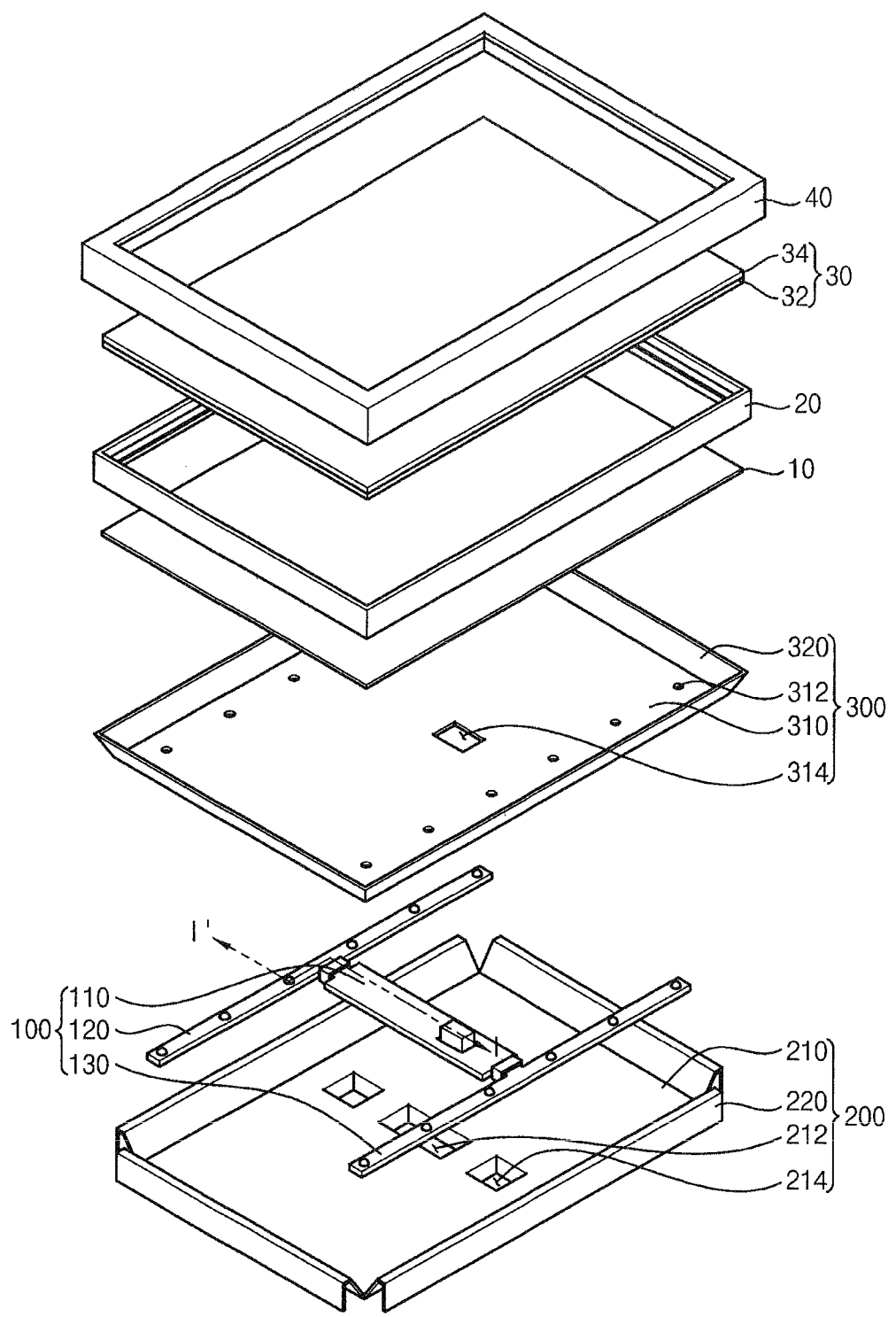
FIG. 1 is an exploded perspective view illustrating a display apparatus according to an exemplary embodiment of the present invention.

FIG. 1 is an exploded perspective view illustrating a display apparatus according to an exemplary embodiment of the present invention.

Referring to FIG. 1, a display apparatus includes a backlight assembly 100, a receiving container having a bottom chassis 200 and a top chassis 40, a reflecting element 300, an optical element 10, a mold frame 20 and a display panel 30.

The backlight assembly 100 provides light to the display panel 30. The backlight assembly 100 includes a driving part 110, a first light source part 120 and a second light source part 130.

Each of the first light source part 120 and the second light source part 130 includes a plurality of light sources for generating the light. For example, the light source may be a spot light source such as a light emitting diode (LED).

The driving part 110 is electrically connected to the first light source part 120 and the second light source part 130. The driving part 110 includes a driving circuit to drive the first light source part 120 and the second light source part 130. For example, the driving part 110 may include a transformer (refer to 112 of FIG. 2) for boosting an input voltage to a driving voltage for the first and second light source parts 120 and 130, and a driving chip (refer to 114 of FIG. 2) for processing a driving signal for the first and second light source parts 120 and 130.

The reflecting element 300 is disposed on the backlight assembly 100. The reflecting element 300 reflects the light from the backlight assembly 100 toward the display panel 30. The reflecting element 300 includes a bottom portion 310 and an inclined portion 320 formed at boundaries of the bottom portion 310. The inclined portion 320 is slanted with respect to the bottom portion 310 by a predetermined angle, so that the light from the backlight assembly 100 may be efficiently reflected toward the display panel 30.

A plurality of light source holes 312 which corresponds to each of the light sources of the backlight assembly 100 is formed through the bottom portion 310. When the reflecting element 300 is disposed on the backlight assembly 100, the light sources of the backlight assembly 100 are exposed through the light source holes 312.

In addition, an opening 314 which exposes a circuit component of the driving part 110 may be formed through the bottom portion 310. For example, when the reflecting element 300 is disposed on the backlight assembly 100, the transformer (refer to 112 of FIG. 2) of the driving part 110 may be exposed through the opening 314.

The optical element 10 is disposed on the reflecting element 300. The optical element 10 may improve an optical property of the light from the backlight assembly 100. Thus, the optical element 10 may make the light uniformly bright. The optical element 10 may include plurality of optical sheets. For example, the optical element 10 may include a protecting sheet, a prism sheet and a diffusion sheet. The diffusion sheet is disposed on a light exiting surface of a light guiding plate. The prism sheet is disposed on the diffusion sheet. The protecting sheet is disposed on the prism sheet. The prism sheet may include an upper prism sheet and a lower prism sheet. An axis of the upper prism sheet may be substantially perpendicular to an axis of the lower prism sheet. Although the optical element 10 is described as including the protecting sheet, the prism sheet and the diffusion sheet, many modifications to the optical element 10 are possible.

The display panel 30 is disposed on the optical element 10. The display panel 30 displays an image using the light from the backlight assembly 100 according to a driving signal and a data signal. The display panel 30 includes an array substrate 32, an opposite substrate 34 and a liquid crystal layer (not shown) between the array substrate 32 and the opposite substrate 34.

The array substrate 32 includes a plurality of gate lines, a plurality of data lines crossing the gate lines, and a plurality of switching elements connected to the gate and data lines. The opposite substrate 34 may include a black matrix for blocking light and a color filter having a color. Although the opposite substrate 34 includes the color filter in the present exemplary embodiment, the color filter may be formed in the array substrate 32. The liquid crystal layer is disposed between the array substrate 32 and the opposite substrate 34. The liquid crystal layer includes liquid crystal molecules being optically anisotropic. The liquid crystal molecules are driven by an electric field, so that light may pass through or be blocked by the liquid crystal layer to display an image.

The display panel 30 may be electrically connected to a driving part (not shown) to drive the display panel 30. For example, the driving part may be a flexible printed circuit board, the array substrate 32 may be electrically connected to the driving part, and the driving part is disposed on a bottom or side of the backlight assembly 100.

The mold frame 20 supports and fixes components of the display apparatus. For example, the mold frame 20 supports the display panel 30 to fix the display panel 30 in the display apparatus.

The receiving container receives the components of the display apparatus. For example, the receiving container includes the bottom chassis 200 and the top chassis 40. The bottom chassis 200 includes a bottom plate 210 and a side wall 220 extending from a boundary of the bottom plate 210. The bottom plate 210 and the side wall 220 form a receiving space. A first recess 212 and a second recess 214 are formed on the bottom plate 210. The first and second recesses 212 and 214 partially receive the backlight assembly 100. The backlight assembly 100, the reflecting element 300, the optical element 10 the mold frame 20 and the display panel 30 are received in the receiving space. The top chassis 40 is combined with the bottom chassis 200.

Figure 2:
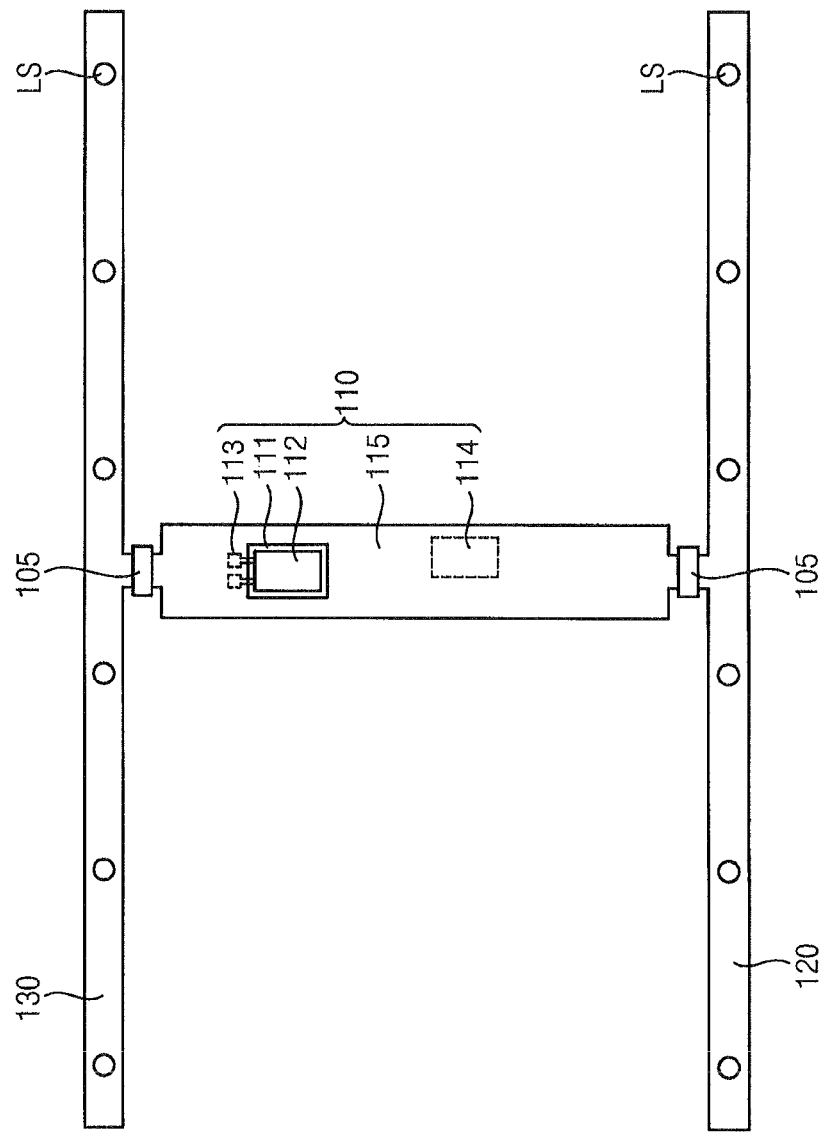
FIG. 2 is a plan view illustrating a backlight assembly of FIG. 1, according to an exemplary embodiment of the present invention.

FIG. 2 is a plan view illustrating a backlight assembly of FIG. 1, according to an exemplary embodiment of the present invention.

Referring to FIG. 2, a backlight assembly includes a driving part 110, a first light source part 120, a second light source part 130 and a connecting part 105.

The first light source part 120 has a bar shape extended in one direction. The first light source part 120 includes a plurality of light sources LS arranged in the direction. The light sources LS may be disposed at a predetermined distance from one another. The light source LS may be a spot light source. For example the light source LS may be an LED light source having a lens.

The second light source part 130 is spaced apart from the first light source part 120, and in parallel with the first light source part 120. The second light source part 130 has a bar shape extended in one direction. The second light source part 130 includes a plurality of light sources LS arranged in the direction. The light sources LS may be disposed at a predetermined distance from one another. The light source LS may be a spot light source. For example the light source LS may be an LED light source having a lens.

The driving part 110 is electrically connected to the first light source part 120 and the second light source part 130, and configured to drive the first light source part 120 and the second light source part 130. The driving part 110 is extended perpendicular to the direction in which the first light source part 120 and the second light source part 130 are extended. Thus, the first light source part 120 and the second light source part 130 may be connected by the driving part 110 at both ends of the driving part 110.

The driving part 110 includes a driving part substrate 115, a transformer 112 and a driving chip 114. The transformer 112 boosts an input voltage to a driving voltage for the light source LS. For example, the transformer 112 may boost about 24V of the input voltage to about 300V of the driving voltage to drive the light source which is an LED light source. The driving chip 114 processes a driving signal for the light source LS. For example, the driving chip 114 may be an integrated circuit (IC) chip for processing the driving signal for the light source LS.

The driving chip 114 may be disposed on a rear surface of the driving part substrate 115. Thus, the driving chip 114 may face the bottom plate 210 of the bottom chassis 200.

The transformer 112 may be disposed in an opening 111 formed through the driving part substrate 115. The transformer 112 may be connected to a driving circuit of the driving part 110 by a connecting terminal 113. The transformer 112 is disposed in the opening 111, so that a total height of the driving part 110 may be decreased, since the transformer 112 is not disposed on the driving part substrate 115.

The connecting part 105 connects the first light source part 120 to the driving part 110, and connects the second light source part 130 to the driving part 110. The connecting part 105 may have a connector for connecting the first or second light source part 120 or 130 to the driving part 110 for assembly efficiency. The connecting part 105 is connected to a central portion of the first light source part 120, and connected to a central portion of the second light source part 130, so that the driving part 110 may be disposed at center the first light source part 120 and the second light source part 130. Thus, the backlight assembly 100 may be driven without an additional connecting circuit board for connecting the first light source part 120 and the second light source part 130.

Figure 5:
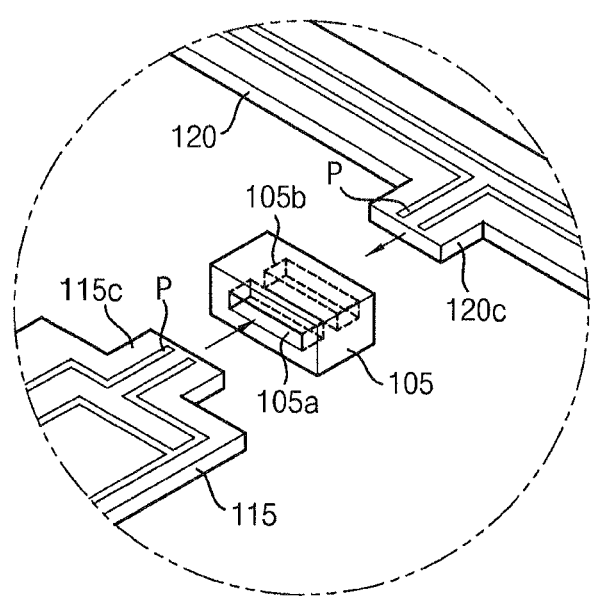
FIG. 5 is an exploded perspective view illustrating a connecting part of the backlight assembly of FIG. 2, according to an exemplary embodiment of the present invention.

A detailed explanation about the connecting part 105 will be provided in reference to FIG. 5.

Figure 3:
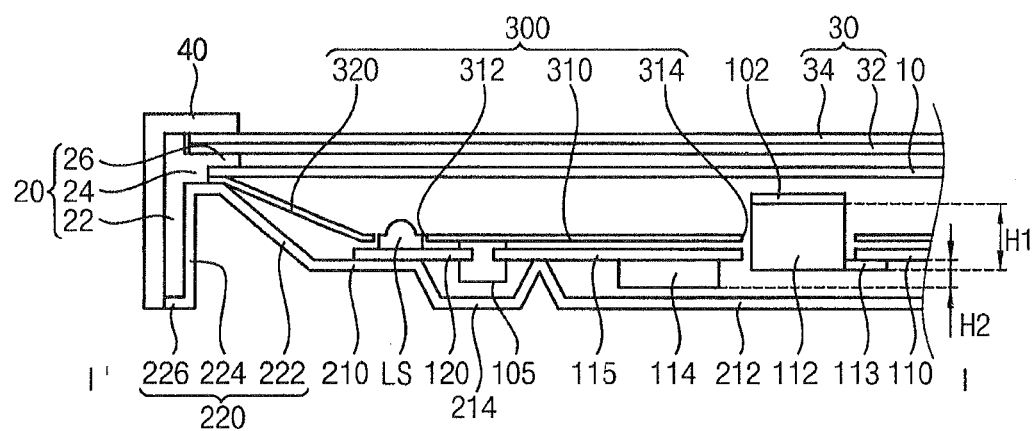
FIG. 3 is a cross-sectional view taken along a line I-I' of FIG. 1.

FIG. 3 is a cross-sectional view taken along a line I-I' of FIG. 1.

Referring to FIGS. 3 and 1, a display apparatus includes a backlight assembly 100 having a driving part 110, a first light source part 120 and a second light source part 130, a bottom chassis 200, a reflecting element 300, an optical element 10, a mold frame 20, a display panel 30, and top chassis 40.

The bottom chassis 200 includes a bottom plate 210 and a side wall 220.

A first recess 212 and a second recess 214 are formed on the bottom plate 210. The first and second recesses 212 and 214 partially receive the backlight assembly 100.

The side wall 220 includes an inclined surface 222, an outside wall 224 and a supporting portion 226. The inclined surface 222 extends from a boundary of the bottom plate 210, and is inclined with respect to the bottom plate 210. The outside wall 224 extends from the inclined surface 222 perpendicular to the bottom plate 210. The supporting portion 226 extends from the outside wall 224 in parallel with the bottom plate 210 and is configured to support the mold frame 20.

The driving part 110 includes a driving part substrate 115, a transformer 112 and a driving chip 114.

The driving part substrate 115 is disposed on the bottom plate 210 of the bottom chassis 200. The driving chip 114 is disposed on a rear surface of the driving part substrate 115. Thus, the driving chip 114 is disposed in the first recess 212 of the bottom plate 210. A depth of the first recess 212 may be larger than a second height H2 of the driving chip 114. Thus, the driving chip 114 may be spaced apart from a surface of the first recess 212.

The transformer 112 may be disposed in an opening 111 formed through the driving part substrate 115. The transformer 112 may have a first height H1. For example, the transformer 112 may boost about 24V of the input voltage to about 300V of the driving voltage to drive the light source which is an LED light source. In this case, the first height H1 of the transformer 112 may be about 15 mm. In addition, a length of a surface of the transformer 112 which is in parallel with the driving part substrate 115 may be about 30 mm.

The transformer 112 may be connected to a driving circuit of the driving part 110 by a connecting terminal 113. A reflecting layer 102 may be formed on the transformer 112. For example, the reflecting layer 102 may be formed by coating a reflective material on the transformer 112.

The first light source part 120 having the light source LS may be disposed on the bottom plate 210 of the bottom chassis 200, and in a plane the same as the driving part 110. The first light source part 120 is electrically connected by the connecting part 105. The connecting part 105 is partially disposed in the second recess 214 of the bottom plate 210 of the bottom chassis 200.

The reflecting element 300 is disposed on the backlight assembly 100. The reflecting element 300 includes a bottom portion 310 and an inclined portion 320 formed at boundaries of the bottom portion 310. The inclined portion 320 is slanted with respect to the bottom portion 310 by a predetermined angle. The inclined portion 320 is disposed on the inclined surface 222 of the side wall 220 of the bottom chassis 200. The inclined portion 320 is disposed adjacent to the light source LS, and extends to a boundary of the display apparatus. Thus, the number of the light sources LS of the backlight assembly 100 is decreased, and a size of the inclined portion 320 is increased, so that the angle between the inclined portion 320 and the bottom portion 310 is decreased. In addition, a total thickness of the display apparatus is decreased, so that the angle between the inclined portion 320 and the bottom portion 310 is decreased.

A plurality of light source holes 312 which corresponds to each of the light sources LS is formed through the bottom portion 310. The light source LS is exposed through the light source hole 312. In addition, an opening 314 corresponding to the transformer 112 of the driving part 110 is formed through the bottom portion 310. The transformer 112 is exposed through the opening 314.

The optical element 10 is disposed on the reflecting element 300. The optical element 10 is spaced apart from the bottom portion 310 of the reflecting element 300. The optical element 10 may improve an optical property of the light from the backlight assembly 100.

The mold frame 20 is disposed between the outer wall 224 of the side wall 220 of the bottom chassis 200 and the top chassis 40. The mold frame 20 includes a base frame 22, an optical element receiving portion 24 and a panel supporting part 26. The base frame 22 composes a body of the mold frame 20. The optical element receiving portion 24 forms a space for receiving boundaries of the optical element 10 and boundaries of the inclined portion 320 of the reflecting element 300. The panel supporting part 26 supports the display panel 30.

The display panel 30 is disposed on the optical element 10. The display panel 30 may be spaced apart from the optical element 10 by the panel supporting part 26 of the mold frame 20. The display panel 30 displays an image using light from the backlight assembly 100 according to a driving signal and a data signal. The display panel 30 includes an array substrate 32, an opposite substrate 34 and a liquid crystal layer (not shown) between the array substrate 32 and the opposite substrate 34.

The top chassis 40 is combined with the mold frame 20 and the bottom chassis 200 to fix the display panel 30.

Figure 4:
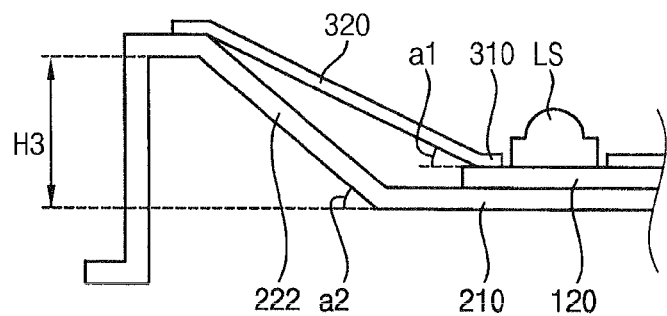
FIG. 4 is a partially-enlarged cross-sectional view illustrating an inclined portion of a reflecting element and an inclined surface of a side wall of a bottom chassis, according to an exemplary embodiment of the present invention.

FIG. 4 is a partially-enlarged cross-sectional view illustrating an inclined portion of a reflecting element and an inclined surface of a side wall of a bottom chassis, according to an exemplary embodiment of the present invention.

Referring to FIG. 4, the bottom chassis includes a bottom plate 210 and a side wall including an inclined surface 222. The reflecting element includes a bottom portion 310 and an inclined portion 320.

The bottom portion 310 of the reflecting element makes a first angle a1 with the inclined portion 320. The inclined portion 320 is adjacent to a light source LS of a first light source part 120, and extends to a boundary of the display apparatus. The number of the light sources LS of the backlight assembly is decreased, the light source LS is disposed further from the boundary of the display apparatus and a size of the inclined portion 320 is increased, so that the first angle a1 is decreased. In addition, a total thickness of the display apparatus is decreased, a third height H3 of the side wall of the bottom chassis is decreased and the first angle a1 is decreased.

The inclined surface 222 of the bottom chassis makes a second angle a2 with the bottom plate 210. The second angle a2 may be the same as or larger than the first angle a1. Although the inclined surface 222 of the bottom chassis is spaced apart from the inclined portion 320 of the reflecting element in the present exemplary embodiment, the inclined portion 320 may make contact with the inclined surface 222.

The first angle a1 of the inclined portion 320 of the reflecting element may decrease, as the number of the light sources LS of the backlight assembly is decreased, or as the third height H3 of the side wall is decreased. For example, the first angle a1 may be about 20 degrees to about 30 degrees. Accordingly, the third height H3 may be less than about 20 mm.

FIG. 5 is an exploded perspective view illustrating a connecting part of the backlight assembly of FIG. 2, according to an exemplary embodiment of the present invention.

Referring to FIG. 5, a connecting part 105 includes a first socket 105a and a second socket 105b opposite to the first socket 105a.

A connector 115c of the driving part substrate 115 protruded from the driving part substrate 115 is inserted into the first socket 105a of the connecting part 105. A circuit pattern P is formed on the connector 115c and electrically connected to the first socket 105a. A connector 120c of the first light source part 120 protruded from the first light source part 120 is inserted into the second socket 105b of the connecting part 105. A circuit pattern P is formed on the connector 120c and electrically connected to the second socket 105b. The first and second sockets 105a and 105b are electrically connected each other, so that the driving part substrate 115 and the first light source part 120 may be electrically connected to the connecting part 105.

Figure 6:
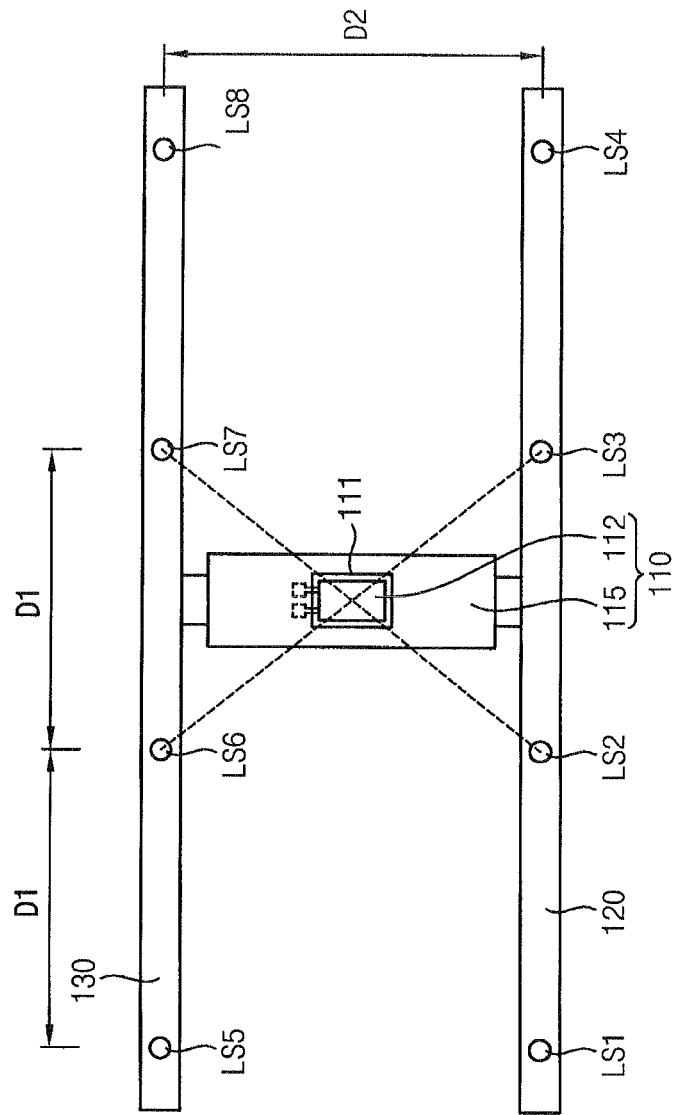
FIG. 6 is a plan view illustrating a backlight assembly according to an exemplary embodiment of the present invention.

FIG. 6 is a plan view illustrating a backlight assembly according to an exemplary embodiment of the present invention.

Referring to FIG. 6, a backlight assembly includes a driving part 110, a first light source part 120 and a second light source part 130.

The first light source part 120 has a bar shape extended in one direction. The first light source part 120 includes first to fourth light sources LS1, LS2, LS3 and LS4 sequentially arranged in the direction. Each of the first to fourth light sources LS1, LS2, LS3 and LS4 is spaced apart from an adjacent light source by a first distance D1.

The second light source part 130 is spaced apart from the first light source part 120 by a second distance D2, and in parallel with the first light source part 120. The second light source part 130 has a bar shape extended in one direction. The second light source part 130 includes fifth to eighth light sources LS5, LS6, LS7 and LS8 sequentially arranged in the direction. Each of the fifth to eighth light sources LS5, LS6, LS7 and LS8 is spaced apart from an adjacent light source by a first distance D1.

The first distance D1 may be substantially the same as the second distance D2. Thus, the first to eighth light sources LS1 to LS8 may be uniformly arranged.

The driving part 110 includes a driving part substrate 115 and a transformer 112. The transformer 112 is disposed in an opening 111 formed through the driving part substrate 115.

The transformer 112 may be the tallest and largest component among circuit components of a driving circuit of the driving part 110. Thus, a portion of the transformer 112 may be protruded from an opening in a reflecting element (refer to 314 and 300 of FIG. 1). The transformer 112 may be disposed at a position which is farthest from adjacent light sources (e.g., the second, third, sixth and seventh light sources LS2, LS3, LS6 and LS7) to minimize its influence on the adjacent light sources. For example, the transformer 112 may be disposed at an intersection point of a first straight line and a second straight line. The first straight line is from the second light source LS2 to the seventh light source LS7. The second straight line is from the third light source LS3 to the sixth light source LS6. Thus, the transformer 112 may be disposed at a center of the driving part 110.

Figure 7:
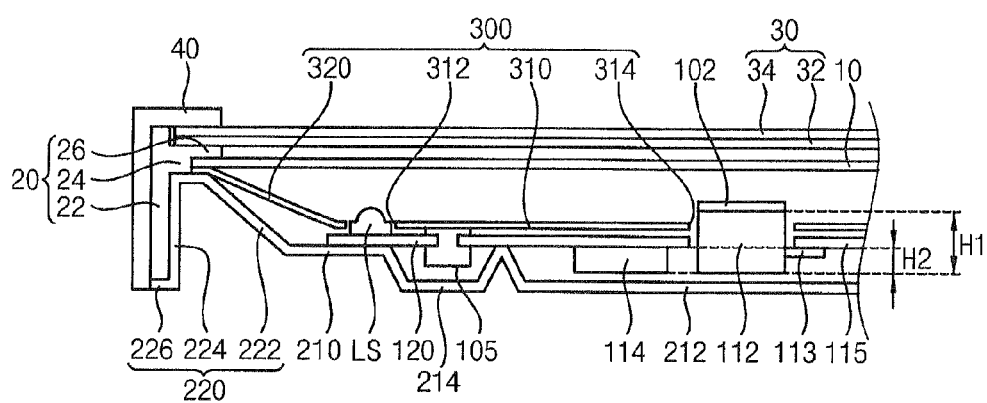
FIG. 7 is a cross-sectional view illustrating a display apparatus according to an exemplary embodiment of the present invention.

FIG. 7 is a cross-sectional view illustrating a display apparatus according to an exemplary embodiment of the present invention.

Referring to FIGS. 7 and 1, a display apparatus includes a backlight assembly 100 having a driving part 110, a first light source part 120 and a second light source part 130, a bottom chassis 200, a reflecting element 300, an optical element 10, a mold frame 20, a display panel 30, and top chassis 40.

The bottom chassis 200 includes a bottom plate 210 and a side wall 220.

A first recess 212 and a second recess 214 are formed on the bottom plate 210. The first and second recesses 212 and 214 partially receive the backlight assembly 100.

The side wall 220 includes an inclined surface 222, an outside wall 224 and a supporting portion 226. The inclined surface 222 extends from a boundary of the bottom plate 210, and is inclined with respect to the bottom plate 210. The outside wall 224 extends from the inclined surface 222 perpendicular to the bottom plate 210. The supporting portion 226 extends from the outside wall 224 in parallel with the bottom plate 210 and is configured to support the mold frame 20.

The driving part 110 includes a driving part substrate 115, a transformer 112 and a driving chip 114.

The driving part substrate 115 is disposed on the bottom plate 210 of the bottom chassis 200. The driving chip 114 is disposed on a rear surface of the driving part substrate 115. Thus, the driving chip 114 is disposed in the first recess 212 of the bottom plate 210. A depth of the first recess 212 may be larger than a second height H2 of the driving chip 114. Thus, the driving chip 114 may be spaced apart from a surface of the first recess 212.

The transformer 112 may be disposed in an opening 111 formed through the driving part substrate 115. The transformer 112 may have a first height H1. A portion of the transformer 112 is protruded from the rear surface of the driving part substrate 115 by a second height H2, the rest of the transformer 112 is protruded from the front surface of the driving part substrate 115, except for the part of the transformer 112 disposed between the front and rear surfaces of the driving part substrate 115. Thus, the transformer 112 is protruded from the rear surface of the driving part substrate 115 by the second height H2 the same as that of the driving chip 114, and protruded through an opening of the reflecting element 300. Thus, the depth of the first recess 212 may be minimized, and the protruded height of the transformer 112 from the reflecting element 300 may be minimized at the same time.

The transformer 112 may be connected to a driving circuit of the driving part 110 by a connecting terminal 113. A reflecting layer 102 may be formed on the transformer 112. For example, the reflecting layer 102 may be formed by coating a reflective material on the transformer 112.

The first light source part 120 having the light source LS may be disposed on the bottom plate 210 of the bottom chassis 200, and in a plane the same as the driving part 110. The first light source part 120 is electrically connected by the connecting part 105. The connecting part 105 is partially disposed in the second recess 214 of the bottom plate 210 of the bottom chassis 200.

The reflecting element 300 is disposed on the backlight assembly 100. The reflecting element 300 includes a bottom portion 310 and an inclined portion 320 formed at boundaries of the bottom portion 310. The inclined portion 320 is slanted with respect to the bottom portion 310 by a predetermined angle. The inclined portion 320 is disposed on the inclined surface 222 of the side wall 220 of the bottom chassis 200. The inclined portion 320 is disposed adjacent to the light source LS, and extends to a boundary of the display apparatus.

A plurality of light source holes 312 which corresponds to each of the light sources LS is formed through the bottom portion 310. The light source LS is exposed through the light source hole 312. In addition, an opening 314 corresponding to the transformer 112 of the driving part 110 is formed through the bottom portion 310. The transformer 112 is exposed through the opening 314.

The optical element 10 is disposed on the reflecting element 300. The optical element 10 is spaced apart from the bottom portion 310 of the reflecting element 300. The optical element 10 may improve an optical property of the light from the backlight assembly 100.

The mold frame 20 is disposed between the outside wall 224 of the side wall 220 of the bottom chassis 200 and the top chassis 40. The mold frame 20 includes a base frame 22, an optical element receiving portion 24 and a panel supporting part 26. The base frame 22 composes a body of the mold frame 20. The optical element receiving portion 24 forms a space for receiving boundaries of the optical element 10 and boundaries of the inclined portion 320 of the reflecting element 300. The panel supporting part 26 supports the display panel 30.

The display panel 30 is disposed on the optical element 10. The display panel 30 may be spaced apart from the optical element 10 by the panel supporting part 26 of the mold frame 20. The display panel 30 displays an image using light from the backlight assembly 100 according to a driving signal and a data signal. The display panel 30 includes an array substrate 32, an opposite substrate 34 and a liquid crystal layer (not shown) between the array substrate 32 and the opposite substrate 34.

The top chassis 40 is combined with the mold frame 20 and the bottom chassis 200 to fix the display panel 30.

Figure 8:
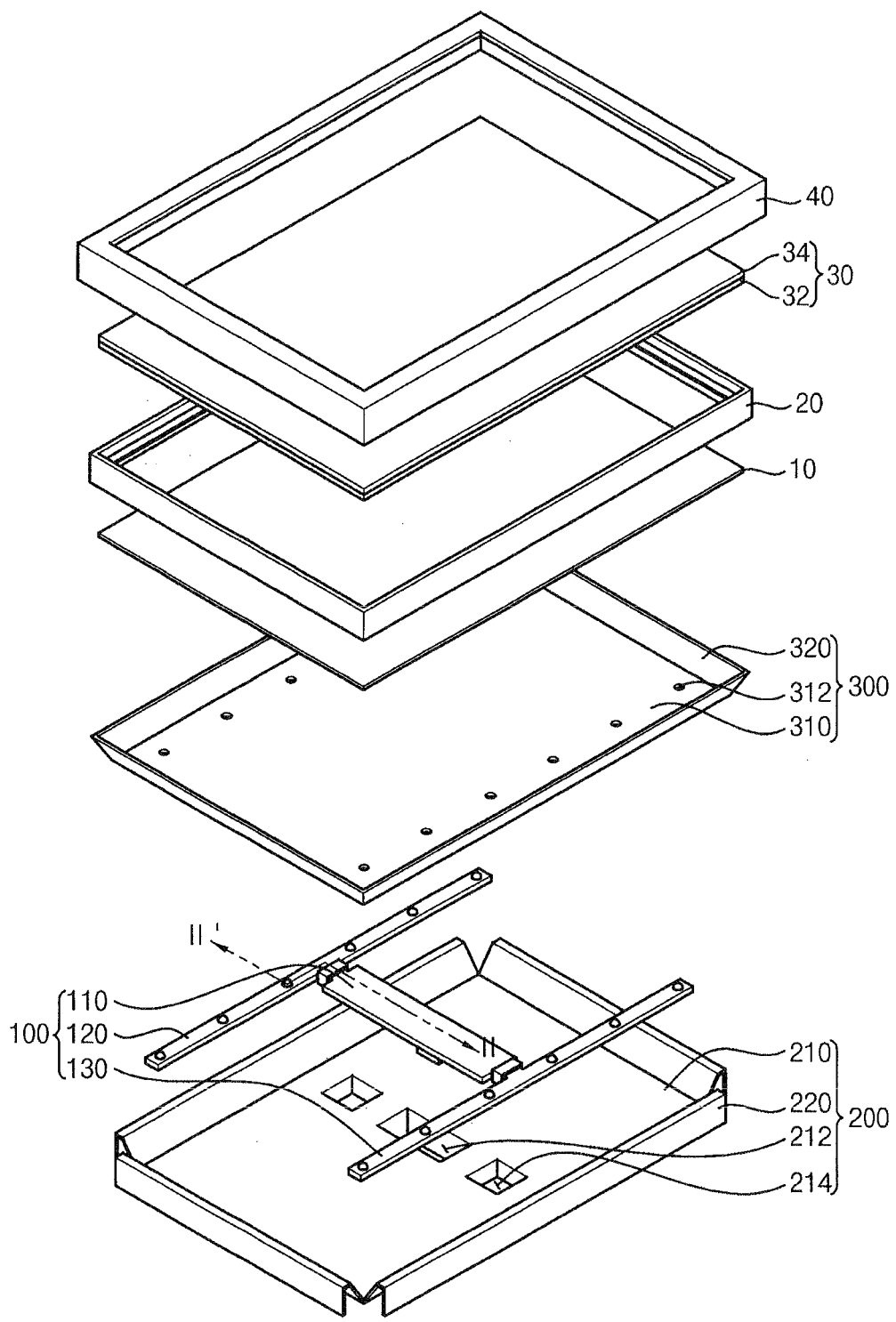
FIG. 8 is an exploded perspective view illustrating a display apparatus according to an exemplary embodiment of the present invention.

FIG. 8 is an exploded perspective view illustrating a display apparatus according to an exemplary embodiment of the present invention.

Referring to FIG. 8, a backlight assembly illustrated therein is substantially the same as a backlight assembly of FIG. 1 except for a driving part 110, a first recess 212 of a bottom plate 210 of a bottom chassis 200, and a reflecting element 300. Thus, any further descriptions concerning the same elements will be brief or omitted.

The display apparatus includes a backlight assembly 100, a receiving container having a bottom chassis 200 and a top chassis 40, a reflecting element 300, an optical element 10, a mold frame 20 and a display panel 30.

The backlight assembly 100 provides light to the display panel 30. The backlight assembly 100 includes a driving part 110, a first light source part 120 and a second light source part 130.

Each of the first light source part 120 and the second light source part 130 includes a plurality of light sources for generating the light.

The driving part 110 is electrically connected to the first light source part 120 and the second light source part 130. The driving part 110 includes a driving circuit to drive the first light source part 120 and the second light source part 130.

The reflecting element 300 is disposed on the backlight assembly 100. The reflecting element 300 reflects the light from the backlight assembly 100 toward the display panel 30. The reflecting element 300 includes a bottom portion 310 and an inclined portion 320 formed at boundaries of the bottom portion 310.

A plurality of light source holes 312 which corresponds to each of the light sources of the backlight assembly 100 is formed through the bottom portion 310. When the reflecting element 300 is disposed on the backlight assembly 100, the light sources of the backlight assembly 100 are exposed through the light source holes 312.

The optical element 10 is disposed on the reflecting element 300. The optical element 10 may improve an optical property of the light from the backlight assembly 100.

The display panel 30 is disposed on the optical element 10. The display panel 30 displays an image using light from the backlight assembly 100 according to a driving signal and a data signal. The display panel 30 includes an array substrate 32, an opposite substrate 34 and a liquid crystal layer (not shown) between the array substrate 32 and the opposite substrate 34.

The mold frame 20 supports and fixes components of the display apparatus.

The receiving container receives the components of the display apparatus. For example, the receiving container includes the bottom chassis 200 and the top chassis 40. The bottom chassis 200 includes a bottom plate 210 and a side wall 220 extending from a boundary of the bottom plate 210. The bottom plate 210 and the side wall 220 form a receiving space. A first recess 212 and a second recess 214 for receiving a portion of the backlight assembly 100 may be formed on the bottom plate 210. The top chassis 40 is combined with the bottom chassis 200.

Figure 9:
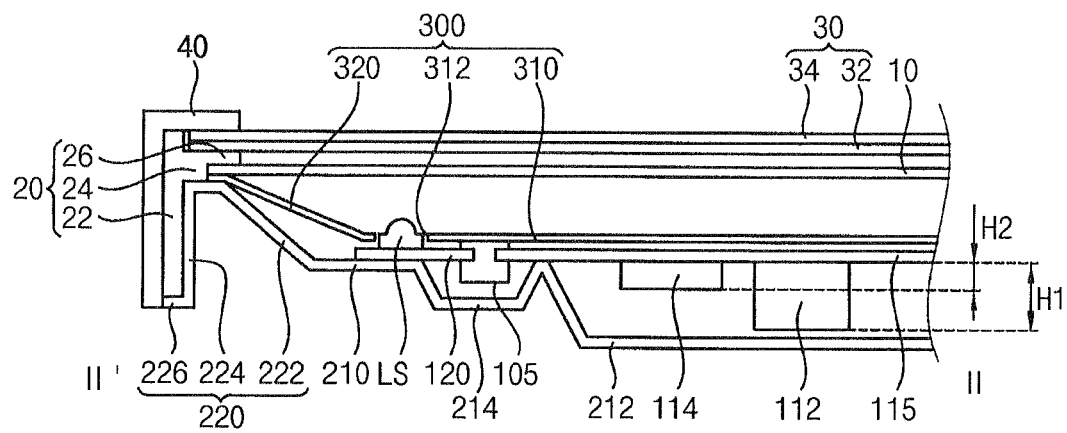
FIG. 9 is a cross-sectional view taken along a line II-II' of FIG. 8.

FIG. 9 is a cross-sectional view taken along a line II-II' of FIG. 8.

Referring to FIGS. 9 and 8, a display apparatus illustrated therein is substantially the same as a display apparatus of FIG. 3, except for a transformer 112 of a driving part 110 of a backlight assembly 100, a first recess 212 of a bottom plate 210 of a bottom chassis 200, and a reflecting element 300. Thus, any further descriptions concerning the same elements will be brief or omitted.

The display apparatus includes a backlight assembly 100 having a driving part 110, a first light source part 120 and a second light source part 130, a bottom chassis 200, a reflecting element 300, an optical element 10, a mold frame 20, a display panel 30, and top chassis 40.

The bottom chassis 200 includes a bottom plate 210 and a side wall 220.

A first recess 212 and a second recess 214 are formed on the bottom plate 210. The first and second recesses 212 and 214 partially receive the backlight assembly 100.

The side wall 220 includes an inclined surface 222, an outside wall 224 and a supporting portion 226.

The driving part 110 includes a driving part substrate 115, a transformer 112 and a driving chip 114.

The driving part substrate 115 is disposed on the bottom plate 210 of the bottom chassis 200. The driving chip 114 is disposed on a rear surface of the driving part substrate 115. Thus, the driving chip 114 is disposed in the first recess 212 of the bottom plate 210. A depth of the first recess 212 may be larger than a second height H2 of the driving chip 114. Thus, the driving chip 114 may be spaced apart from a surface of the first recess 212.

The transformer 112 may be disposed on the rear surface of the driving part substrate 115. The transformer 112 may have a first height H1. The transformer 112 may be spaced apart from the surface of the first recess 212. The first height H1 of the transformer 112 is larger than the second height H2 of the driving chip 114, so that a depth of the first recess 212 is greater than the first height H1.

The first light source part 120 having the light source LS may be disposed on the bottom plate 210 of the bottom chassis 200, and in a plane the same as the driving part 110. The first light source part 120 is electrically connected by the connecting part 105. The connecting part 105 is partially disposed in the second recess 214 of the bottom plate 210 of the bottom chassis 200.

The reflecting element 300 is disposed on the backlight assembly 100. The reflecting element 300 includes a bottom portion 310 and an inclined portion 320 formed at boundaries of the bottom portion 310. The inclined portion 320 is slanted with respect to the bottom portion 310 by a predetermined angle. The inclined portion 320 is disposed on the inclined surface 222 of the side wall 220 of the bottom chassis 200. The inclined portion 320 is disposed adjacent to the light source LS, and extends to a boundary of the display apparatus.

A plurality of light source holes 312 which corresponds to each of the light sources LS is formed through the bottom portion 310. The light source LS is exposed through the light source hole 312.

The optical element 10 is disposed on the reflecting element 300. The optical element 10 is spaced apart from the bottom portion 310 of the reflecting element 300. The optical element 10 may improve an optical property of the light from the backlight assembly 100.

The mold frame 20 is disposed between the outer wall 224 of the side wall 220 of the bottom chassis 200 and the top chassis 40. The mold frame 20 includes a base frame 22, an optical element receiving portion 24 and a panel supporting part 26.

The display panel 30 is disposed on the optical element 10. The display panel 30 may be spaced apart from the optical element 10 by the panel supporting part 26 of the mold frame 20. The display panel 30 displays an image using light from the backlight assembly 100 according to a driving signal and a data signal. The display panel 30 includes an array substrate 32, an opposite substrate 34 and a liquid crystal layer (not shown) between the array substrate 32 and the opposite substrate 34.

The top chassis 40 is combined with the mold frame 20 and the bottom chassis 200 to fix the display panel 30.

Figure 10:
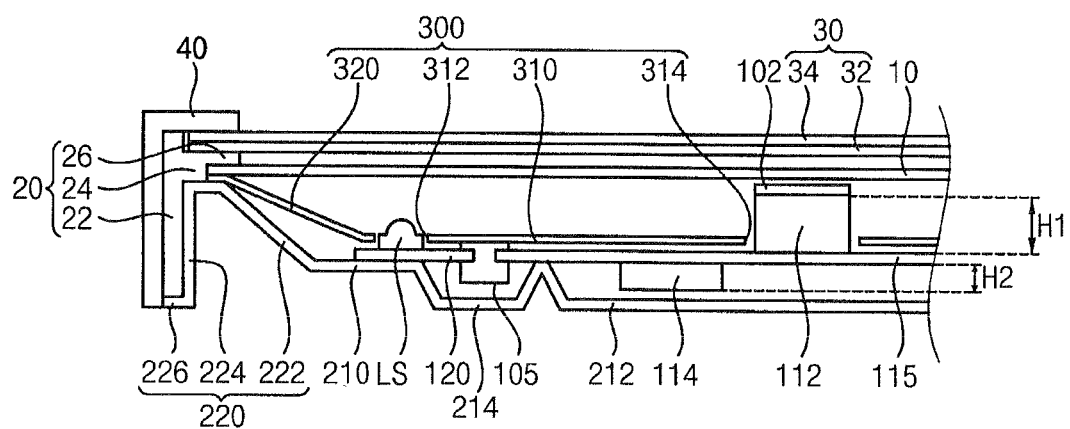
FIG. 10 is a cross-sectional view illustrating a display apparatus according to an exemplary embodiment of the present invention.

FIG. 10 is a cross-sectional view illustrating a display apparatus according to an exemplary embodiment of the present invention.

Referring to FIGS. 10 and 8, a display apparatus illustrated therein is substantially the same as a display apparatus of FIG. 3, except for a transformer 112 of a driving part 110 of a backlight assembly 100. Thus, any further descriptions concerning the same elements will be brief or omitted.

The display apparatus includes a backlight assembly 100 having a driving part 110, a first light source part 120 and a second light source part 130, a bottom chassis 200, a reflecting element 300, an optical element 10, a mold frame 20, a display panel 30, and top chassis 40.

The bottom chassis 200 includes a bottom plate 210 and a side wall 220.

A first recess 212 and a second recess 214 are formed on the bottom plate 210. The first and second recesses 212 and 214 partially receive the backlight assembly 100.

The side wall 220 includes an inclined surface 222, an outside wall 224 and a supporting portion 226.

The driving part 110 includes a driving part substrate 115, a transformer 112 and a driving chip 114.

The driving part substrate 115 is disposed on the bottom plate 210 of the bottom chassis 200. The driving chip 114 is disposed on a rear surface of the driving part substrate 115. Thus, the driving chip 114 is disposed in the first recess 212 of the bottom plate 210. A depth of the first recess 212 may be larger than a second height H2 of the driving chip 114. Thus, the driving chip 114 may be spaced apart from a surface of the first recess 212.

The transformer 112 is disposed on the driving part substrate 115. The transformer 112 may have a first height H1.

A reflecting layer 102 may be formed on the transformer 112. For example, the reflecting layer 102 may be formed by coating a reflective material on transformer 112.

The first light source part 120 having the light source LS may be disposed on the bottom plate 210 of the bottom chassis 200, and in a plane the same as the driving part 110. The first light source part 120 is electrically connected by the connecting part 105. The connecting part 105 is partially disposed in the second recess 214 of the bottom plate 210 of the bottom chassis 200.

The reflecting element 300 is disposed on the backlight assembly 100. The reflecting element 300 includes a bottom portion 310 and an inclined portion 320 formed at boundaries of the bottom portion 310. The inclined portion 320 is slanted with respect to the bottom portion 310 by a predetermined angle. The inclined portion 320 is disposed on the inclined surface 222 of the side wall 220 of the bottom chassis 200. The inclined portion 320 is disposed adjacent to the light source LS, and extends to a boundary of the display apparatus.

A plurality of light source holes 312 which corresponds to each of the light sources LS is formed through the bottom portion 310. The light source LS is exposed through the light source hole 312. In addition an opening 314 corresponding to the transformer 112 of the driving part 110 is formed through the bottom portion 310. The transformer 112 is exposed through the opening 314. The transformer 112 has the first height H1 and the reflecting layer 102 is spaced apart from the optical element 10, so that a height of the side wall 220 is greater than the first height H1.

The optical element 10 is disposed on the reflecting element 300. The optical element 10 is spaced apart from the bottom portion 310 of the reflecting element 300. The optical element 10 may improve an optical property of the light from the backlight assembly 100.

The mold frame 20 is disposed between the outer wall 224 of the side wall 220 of the bottom chassis 200 and the top chassis 40. The mold frame 20 includes a base frame 22, an optical element receiving portion 24 and a panel supporting part 26.

The display panel 30 is disposed on the optical element 10. The display panel 30 may be spaced apart from the optical element 10 by the panel supporting part 26 of the mold frame 20. The display panel 30 displays an image using light from the backlight assembly 100 according to a driving signal and a data signal. The display panel 30 includes an array substrate 32, an opposite substrate 34 and a liquid crystal layer (not shown) between the array substrate 32 and the opposite substrate 34.

The top chassis 40 is combined with the mold frame 20 and the bottom chassis 200 to fix the display panel 30.

Figure 11:
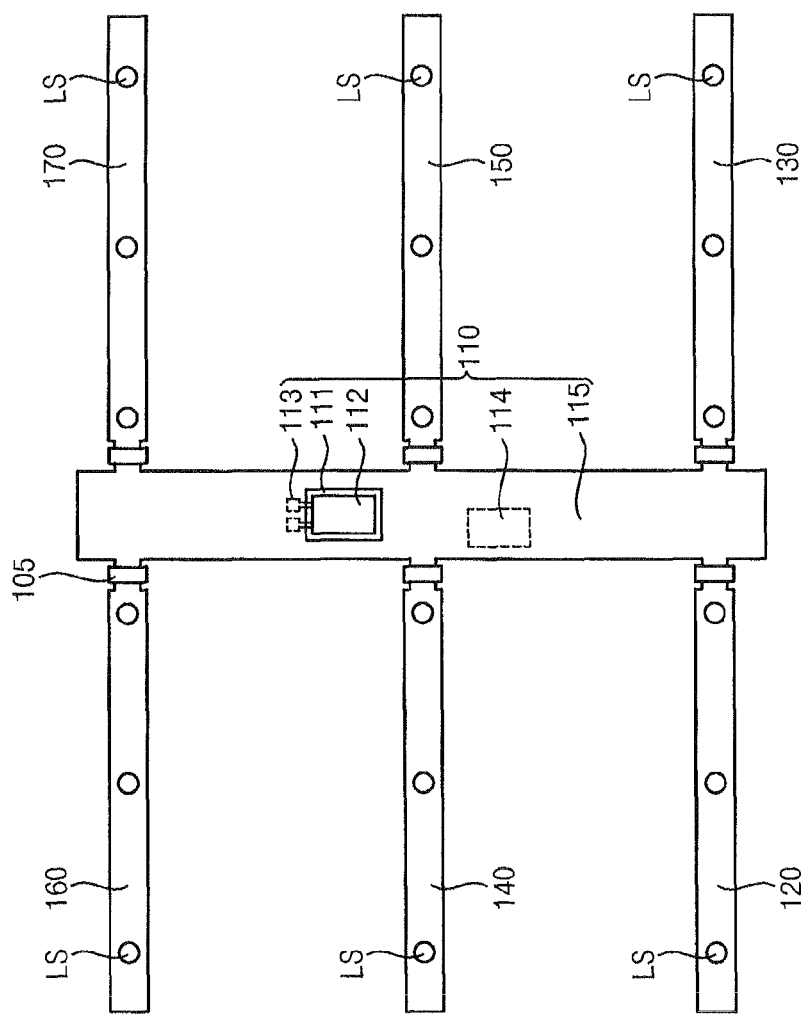
FIG. 11 is a plan view illustrating a backlight assembly according to an exemplary embodiment of the present invention.

FIG. 11 is a plan view illustrating a backlight assembly according to an exemplary embodiment of the present invention.

Referring to FIG. 11, a backlight assembly includes a driving part 110, a first light source part 120, a second light source part 130, a third light source part 140, a fourth light source part 150, a fifth light source part 160, a sixth light source part 170 and a connecting part 105.

The first light source part 120 has a bar shape extended in a direction. The first light source part 120 includes a plurality of light sources LS arranged in the direction. The light sources LS may be disposed at a predetermined distance from each other. The light source LS may be a spot light source. For example the light source LS may be an LED light source having a lens.

The second light source part 130 is disposed in a symmetrical relationship with the first light source part 120 with respect to the driving part 110. The second light source part 130 has a bar shape extended in the direction. The second light source part 130 includes a plurality of light sources LS arranged in the direction. The light sources LS may be disposed at a predetermined distance from each other. The light source LS may be a spot light source. For example the light source LS may be an LED light source having a lens.

The third light source part 140 is spaced apart from the first light source part 120, and is disposed in parallel with the first light source part 120. The third light source part 140 has a bar shape extended in the direction. The third light source part 140 includes a plurality of light sources LS arranged in the direction. The light sources LS may be disposed at a predetermined distance from each other. The light source LS may be a spot light source. For example the light source LS may be an LED light source having a lens.

The fourth light source part 150 is disposed in a symmetrical relationship with the third light source part 140 with respect to the driving part 110. The fourth light source part 150 has a bar shape extended in the direction. The fourth light source part 150 includes a plurality of light sources LS arranged in the direction. The light sources LS may be disposed at a predetermined distance from each other. The light source LS may be a spot light source. For example the light source LS may be an LED light source having a lens.

The fifth light source part 160 is spaced apart from the third light source part 140, and is disposed in parallel with the third light source part 140. The fifth light source part 160 has a bar shape extended in the direction. The fifth light source part 160 includes a plurality of light sources LS arranged in the direction. The light sources LS may be disposed at a predetermined distance from each other. The light source LS may be a spot light source. For example the light source LS may be an LED light source having a lens.

The sixth light source part 170 is disposed in a symmetrical relationship with the fifth light source part 160 with respect to the driving part 110. The sixth light source part 170 has a bar shape extended in the direction. The sixth light source part 170 includes a plurality of light sources LS arranged in the direction. The light sources LS may be disposed at a predetermined distance from each other. The light source LS may be a spot light source. For example the light source LS may be an LED light source having a lens.

The driving part 110 is electrically connected to the first to sixth light source parts 120 to 170, and is configured to drive the first to sixth light source parts 120 to 170. The driving part 110 is extended perpendicular to the direction in which the first to sixth light source parts 120 to 170 are extended. Thus, the first light source part 120 and the second light source part 130 may be connected to the driving part 110 at an end of the driving part 110. The fifth light source part 160 and the sixth light source part 170 may be connected to the driving part 110 at another end of the driving part 110. The third light source part 140 and the fourth light source part 150 may be connected to the driving part 110 at a center of the driving part 110.

The driving part 110 includes a driving part substrate 115, a transformer 112 and a driving chip 114.

The driving chip 114 may be disposed on a rear surface of the driving part substrate 115. Thus, the driving chip 114 may face a bottom plate of a bottom chassis.

The transformer 112 may be disposed in an opening 111 formed through the driving part substrate 115. The transformer 112 may be connected to a driving circuit of the driving part 110 by a connecting terminal 113.

Figure 12:
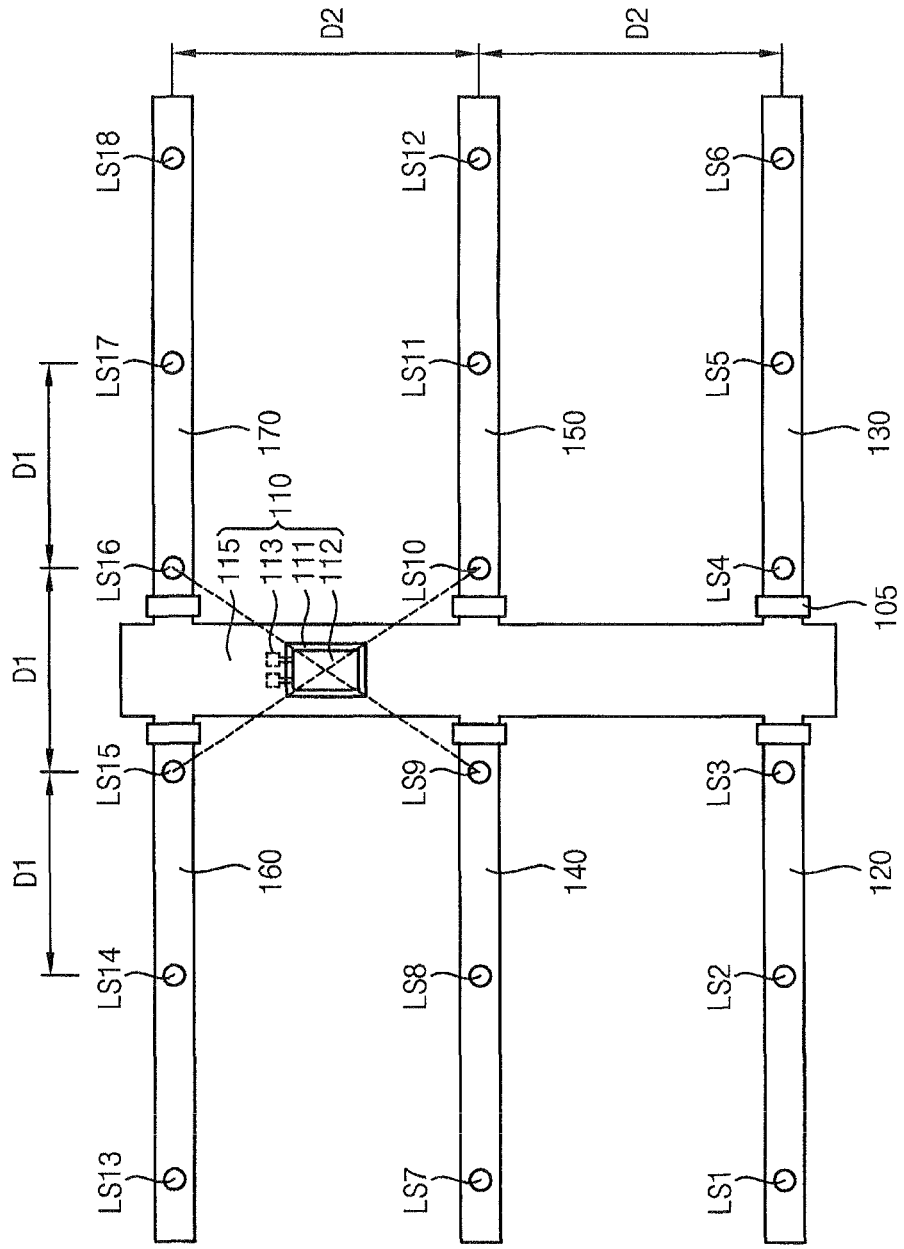
FIG. 12 is a plan view illustrating a backlight assembly according to an exemplary embodiment of the present invention.

FIG. 12 is a plan view illustrating a backlight assembly according to an exemplary embodiment of the present invention.

Referring to FIG. 12, a backlight assembly includes a driving part 110, and first to sixth light source parts 120 to 170.

The first light source part 120 has a bar shape extended in a direction. The first light source part 120 includes a plurality of light sources LS arranged in the direction. The first light source part 120 includes first to third light sources LS1, LS2 and LS3 sequentially arranged in the direction.

The second light source part 130 is disposed in a symmetrical relationship with the first light source part 120 with respect to the driving part 110. The second light source part 130 has a bar shape extended in the direction. The second light source part 130 includes fourth to sixth light sources LS4, LS5 and LS6. Each of the first to sixth light sources LS1 to LS6 is spaced apart from an adjacent light source by a first distance D1.

The third light source part 140 is spaced apart from the first light source part 120 by a second distance D2, and is disposed in parallel with the first light source part 120. The third light source part 140 has a bar shape extended in the direction. The third light source part 140 includes seventh to ninth light sources LS7, LS8 and LS9.

The fourth light source part 150 is disposed in a symmetrical relationship with the third light source part 140 with respect to the driving part 110. The fourth light source part 150 has a bar shape extended in the direction. The fourth light source part 150 includes tenth to twelfth light sources LS10, LS11 and LS12. Each of the seventh to twelfth light sources LS7 to LS12 is spaced apart from an adjacent light source by the first distance D1.

The fifth light source part 160 is spaced apart from the third light source part 140 by the second distance D2, and is disposed in parallel with the third light source part 140. The fifth light source part 160 has a bar shape extended in the direction. The fifth light source part 160 includes thirteenth to fifteenth light sources LS13, LS14 and LS15.

The sixth light source part 170 is disposed in a symmetrical relationship with the fifth light source part 160 with respect to the driving part 110. The sixth light source part 170 has a bar shape extended in the direction. The sixth light source part 170 includes sixteenth to eighteenth light sources LS16, LS17 and LS18. Each of the thirteenth to eighteenth light sources LS13 to LS18 is spaced apart from an adjacent light source by the first distance D1.

The first distance D1 may be substantially the same as the second distance D2. Thus, the first to eighteenth light sources LS1 to LS18 may be uniformly arranged.

The driving part 110 includes a driving part substrate 115 and a transformer 112. The transformer 112 is disposed in an opening 111 formed through the driving part substrate 115.

The transformer 112 may be the tallest and largest component among circuit components of a driving circuit of the driving part 110. Thus, a portion of the transformer 112 may be protruded from a reflecting element (refer to 300 of FIG. 1). The transformer 112 may be disposed at a position which is farthest from adjacent light sources (e.g., the ninth, tenth, fifteenth and sixteenth light sources LS9, LS10, LS15 and LS16) to minimize an influence to the adjacent light sources. For example, the transformer 112 may be disposed at an intersection point of a first straight line and a second straight line. The first straight line is from the ninth light source LS9 to the sixteenth light source LS16. The second straight line is from the tenth light source LS10 to the fifteenth light source LS15. For example, the transformer 112 may be disposed at an area ⅔ away from an end of the driving part 110 in a length direction of the driving part 110.

Figure 13:
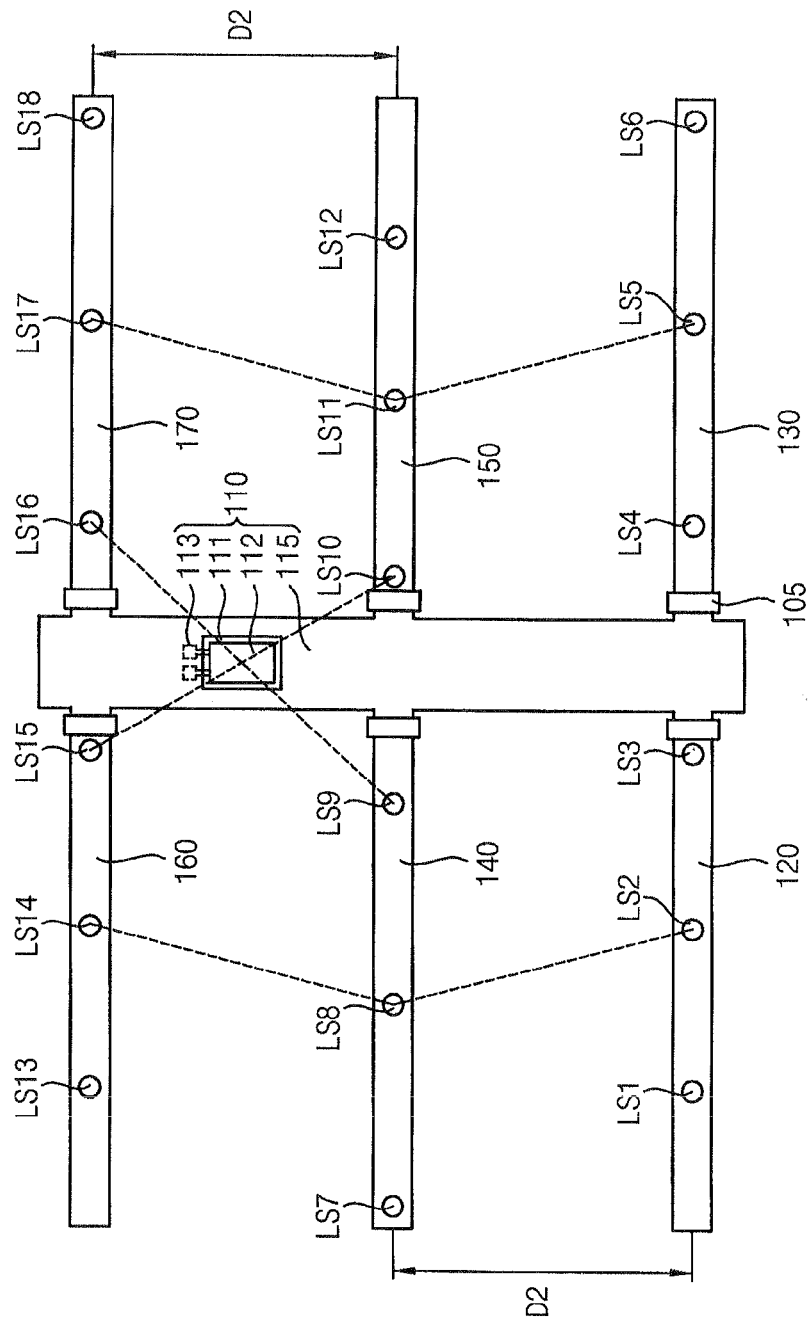
FIG. 13 is a plan view illustrating a backlight assembly according to an exemplary embodiment of the present invention.

FIG. 13 is a plan view illustrating a backlight assembly according to an exemplary embodiment of the present invention.

Referring to FIG. 13, a backlight assembly illustrated therein is substantially the same as a backlight assembly of FIG. 12 except for positions of light sources. Thus, any further descriptions concerning the same elements will be brief or omitted.

The backlight assembly includes a driving part 110, and first to sixth light source parts 130 to 170.

The first light source part 120 includes first to third light sources LS1, LS2 and LS3. The second light source part 130 includes fourth to sixth light sources LS4, LS5 and LS6. The third light source part 140 includes seventh to ninth light sources LS7, LS8 and LS9. The fourth light source part 150 includes tenth to twelfth light sources LS10, LS11 and LS12. The fifth light source part 160 includes thirteenth to fifteenth light sources LS13, LS14 and LS15. The sixth light source part 170 includes sixteenth to eighteenth light sources LS16, LS17 and LS18.

The first to sixth light sources LS1 to LS6 of the first and second light source parts 120 and 130 are disposed corresponding to the thirteenth to eighteenth light sources LS13 to LS18 of the fifth and sixth light source parts 160 and 170, respectively. Thus, the corresponding light sources are disposed in a same column. In addition, the seventh to twelfth light sources LS7 to LS12 of the third and fourth light source parts 140 and 150 are disposed between the columns formed by the light sources of the first, second, fifth and sixth light source part 120, 130, 160 and 170. Thus, the light sources of the backlight assembly are disposed in a zigzag pattern in a column direction. Accordingly, the light sources may be uniformly arranged.

According to the exemplary embodiments of the present invention, a backlight assembly of a display apparatus includes a driving part disposed between a first light source part and a second light source part, so that the backlight assembly may be driven without an additional connecting circuit board for connecting the first light source part and the second light source part.

In addition, a transformer of the driving part is disposed in an opening of a driving part substrate, so that total thickness of the display apparatus may be decreased.

In addition, an angle between a bottom portion and an inclined portion of a reflecting element is decreased, so that total thickness of the display apparatus may be decreased and the number of light sources of the backlight assembly may be decreased.

In addition, the transformer of the driving part is disposed farthest from the light sources, so that light projected toward a display panel may be uniform.

While the present invention has been particularly shown and described with reference to exemplary embodiments thereof, it will be understood by those of ordinary skill in the art that various changes in form and detail may be made therein without departing from the spirit and scope of the present invention as defined by the following claims.

What is claimed is:

1. A backlight assembly, comprising:
   a first light source part comprising a plurality of light sources and extending in a first direction;
   a second light source part comprising a plurality of light sources, wherein the second light source part is spaced apart from and in parallel with the first light source part; and
   a driving part disposed between the first light source part and the second light source par, wherein the driving part is connected to the first and second light source parts, and is configured to drive the light sources of the first and second light source parts,
   wherein the driving part comprises a driving part substrate, a transformer configured to boost an input voltage to a driving voltage for the light sources of the first and second light source parts, and a driving chip configured to process a driving signal for the light sources of the first and second light source parts.

2. The backlight assembly of claim 1, wherein an opening is formed through the driving part substrate, and the transformer is disposed in the opening.

3. The backlight assembly of claim 2, wherein the driving chip of the driving part is disposed on a surface of the driving part substrate, and the transformer is protruded from the surface of the driving part substrate by substantially the same height as the driving chip.

4. The backlight assembly of claim 1, wherein the transformer is disposed at a center of the driving part substrate.

5. The backlight assembly of claim 1, wherein a reflecting layer is formed on the transformer.

6. A backlight assembly, comprising:
   a first light source part comprising a plurality of light sources and extending in a first direction;
   a second light source part comprising a plurality of light sources, wherein the second light source part is spaced apart from and in parallel with the first light source part; and
   a driving part disposed between the first light source part and the second light source part, wherein the driving part is connected to the first and second light source parts, and is configured to drive the light sources of the first and second light source parts,
   wherein a center of the first light source part is connected to a first side of the driving part, and a center of the second light source part is connected to a second side of the driving part which is opposite to the first side, wherein first and second connectors are protruded from the center of the first light source part and the center of the second light source part, respectively, and third and fourth connectors are protruded from the first side and the accord side of the driving part, respectively, the first light source part and the second light source part are connected to the driving part by first and second connecting parts, respectively, and the first connecting part comprises a first socket in which the first connector of the first light source part is inserted, and a second socket in which the third connector of the driving part is inserted.

7. A display apparatus, comprising:
a backlight assembly comprising:
 a first light source part comprising a plurality of light sources and extending in a first direction;
 a second light source part comprising a plurality of light sources, wherein the second light source part is spaced apart from and in parallel with the first light source part; and
 a driving part disposed between the first light source part and the second light source part, wherein the driving part is connected to the first and second light source parts, and is configured to drive the light sources of the first and second light source parts;
a reflecting element disposed on the backlight assembly;
a display panel disposed on the reflecting element; and
a receiving container configured to receive the backlight assembly, the reflecting element and the display panel,
wherein the reflecting element comprises a bottom portion and an inclined portion formed at boundaries of the bottom portion,
the ink lined portion is slanted with respect to the bottom portion, and
a plurality of light holes which corresponds to each of the light sources of the first and second light source parts is formed through the bottom portion.

8. The display apparatus of claim 7, wherein the driving part of the backlight assembly comprises a driving part substrate, a transformer configured to boost an input voltage to a driving voltage for the light sources of the first and second light source parts, and a driving chip configured to process a driving signal for the light sources of the first and second light source parts.

9. The display apparatus of claim 8, wherein a first opening is formed through the driving part substrate, and the transformer is disposed in the first opening.

10. The display apparatus of claim 9, wherein a second opening which exposes the transformer is formed through the bottom portion of the reflecting element.

11. The display apparatus of claim 8, wherein the driving chip of the driving part is disposed on a surface of the driving part substrate,
 the receiving container comprises a bottom chassis and a top chassis combined with the bottom chassis,
 the bottom chassis comprises a bottom plate in parallel with the display panel and a side wall extending from a boundary of the bottom plate and forming a receiving space, and
 a first recess configured to receive the driving chip is formed on the bottom plate.

12. The display apparatus of claim 11, further comprising a connecting part configured to connect the first or second light source part to the driving part, and
 wherein a second recess configured to partially receive the connecting part is formed on the bottom plate of the bottom chassis.

13. The display apparatus of claim 11, wherein the driving part of the backlight assembly is disposed between the bottom portion of the reflecting element and the bottom plate of the bottom chassis.

14. The display apparatus of claim 11, wherein the side wall of the bottom chassis extends from the bottom plate, and comprises an inclined surface inclined with respect to the bottom plate and an outer wall extending from the inclined surface perpendicular to the bottom plate.

15. The display apparatus of claim 7, wherein the inclined portion of the reflecting element makes an angle about 20 degrees to about 30 degrees with respect to bottom portion.

16. A display apparatus, comprising;
a backlight assembly;
a reflecting element disposed on the backlight assembly;
a display panel disposed on the reflecting element; and
a receiving container configured to receive the backlight assembly, the reflecting element and the display panel, and
wherein the backlight assembly comprises:
a driving part disposed at a center of the display panel;
a first light source part comprising a plurality of light sources, wherein the first light source part extends in a first direction and is connected to the driving part;
a second light source part comprising a plurality of light sources, wherein the second light source part extends in the first direction, is connected to the driving part and is disposed in a symmetrical relationship with the first light source part with respect to the driving part;
a third light source part comprising a plurality of light sources, wherein the third light source part extends in the first direction, is connected to the driving part, and is spaced apart from and disposed in parallel with the first light source part;
a fourth light source part comprising a plurality of light sources, Wherein the fourth light source part extends in the first direction, is connected to the driving part and is disposed in a symmetrical relationship with the third light source part with respect to the driving part;
a fifth light source part comprising a plurality of light sources, wherein the fifth light source part extends in the first direction, is connected to the driving part, and is spaced apart from and disposed in parallel with the third light source part; and
a sixth light source part comprising a plurality of light sources, wherein the sixth light source part extends in the first direction, is connected to the driving part, and is disposed in a symmetrical relationship with the filth light source part with respect to the driving part.

17. The display apparatus of claim 16, wherein one of the light sources of the first light source part and one of the light sources of the fifth light source part are arranged in a first column, and another one of the light sources of the first light source part and another one of the light sources of the fifth light source part are arranged in a second column, and
 one of the light sources of the third light source part is disposed between the first and second columns.

18. A backlight assembly, comprising:
a first light source part including a plurality of light sources arranged in a first direction;
a second light source part including a plurality of light sources arranged in the first direction; and
a driving part disposed between a central portion of the first and second light source parts, wherein the driving part includes an opening in which a transformer is disposed.

* * * * *